(12) United States Patent
Fujii et al.

(10) Patent No.: US 8,529,406 B2
(45) Date of Patent: *Sep. 10, 2013

(54) MULTIPLE-RATIO AUTOMATIC TRANSMISSION CONTROL METHOD AND SYSTEM FOR RATIO UPSHIFTS

(71) Applicant: Ford Global Technologies, LLC, Dearborn, MI (US)

(72) Inventors: Yujii Fujii, Ann Arbor, MI (US); Jahan Asgari, Dearborn, MI (US); Davorin David Hrovat, Ann Arbor, MI (US); Hong Jiang, Canton, MI (US); Gregory Michael Pietron, Canton, MI (US); Bradley Dean Riedle, Northville, MI (US); Christopher John Teslak, Plymouth, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,501

(22) Filed: Nov. 30, 2012

(65) Prior Publication Data

US 2013/0090818 A1     Apr. 11, 2013

Related U.S. Application Data

(63) Continuation of application No. 12/871,485, filed on Aug. 30, 2010, now Pat. No. 8,337,361, which is a continuation-in-part of application No. 12/858,468, filed on Aug. 18, 2010, now Pat. No. 8,328,688, which is a continuation-in-part of application No. 12/693,086, filed on Jan. 25, 2010, now abandoned.

(51) Int. Cl.
    *F16H 61/00*     (2006.01)

(52) U.S. Cl.
    USPC .......................................... 477/155

(58) Field of Classification Search
    USPC .......................................... 477/155
    See application file for complete search history.

(56) References Cited

U.S. PATENT DOCUMENTS

| | | |
|---|---|---|
| 4,220,058 A | 9/1980 | Petzold |
| 4,724,723 A | 2/1988 | Lockhart et al. |
| 4,744,031 A | 5/1988 | Takeda et al. |
| 4,790,418 A | 12/1988 | Brown et al. |
| 4,792,902 A | 12/1988 | Hrovat et al. |
| 4,855,914 A | 8/1989 | Davis et al. |
| 5,058,015 A | 10/1991 | Leorat |
| 5,092,182 A | 3/1992 | Ikeda et al. |
| 5,105,357 A | 4/1992 | Steeby |
| 5,133,227 A | 7/1992 | Iwatsuki |

(Continued)

OTHER PUBLICATIONS

Office Action dated Jun. 12, 2013 for U.S. Appl. No. 13/155,867 filed Jun. 8, 2011, pp. 1-6.

*Primary Examiner* — Dirk Wright

(74) *Attorney, Agent, or Firm* — James Dottavio; Brooks Kushman P.C.

(57) ABSTRACT

A speed ratio shaft control for multiple ratio vehicle transmission has controlled release of an off-going transmission clutch and controlled engagement of an on-coming transmission clutch during a speed ratio upshift, at least one clutch being a friction torque establishing clutch. A controller, using shift-timing software strategy, actively manages in real time a clutch torque level for each clutch so that transient torque disturbances in a transmission torque output shaft are mitigated.

19 Claims, 9 Drawing Sheets

(56) References Cited

U.S. PATENT DOCUMENTS

| | | |
|---|---|---|
| 5,165,286 A | 11/1992 | Hamamura et al. |
| 5,188,005 A | 2/1993 | Sankpal et al. |
| 5,669,851 A | 9/1997 | Tietze |
| 5,839,987 A | 11/1998 | Sawamura et al. |
| 6,278,926 B1 | 8/2001 | Jain et al. |
| 6,482,125 B2 | 11/2002 | Urasawa |
| 6,698,299 B2 | 3/2004 | Cripe |
| 6,846,260 B2 | 1/2005 | Horiuchi |
| 6,949,051 B2 | 9/2005 | Katakura |
| 6,991,584 B2 | 1/2006 | Cowan |
| 7,178,618 B2 | 2/2007 | Komeda et al. |
| 7,243,557 B2 | 7/2007 | May |
| 7,300,381 B2 | 11/2007 | Badillo et al. |
| 7,351,183 B2 * | 4/2008 | Fujii et al. ............ 477/109 |
| 7,478,572 B2 | 1/2009 | Maten et al. |
| 7,503,875 B2 * | 3/2009 | Fujii et al. ............ 477/107 |
| 8,290,668 B2 | 10/2012 | Hirasako et al. |
| 8,328,688 B2 * | 12/2012 | Fujii et al. ............ 477/155 |
| 8,337,361 B2 * | 12/2012 | Fujii et al. ............ 477/155 |
| 2002/0025885 A1 | 2/2002 | Saito et al. |
| 2004/0214687 A1 | 10/2004 | Morisawa et al. |
| 2004/0242374 A1 | 12/2004 | Wheals |
| 2006/0135316 A1 | 6/2006 | Fujii et al. |
| 2008/0139362 A1 | 6/2008 | Fujii et al. |
| 2010/0318269 A1 | 12/2010 | Yanakiev et al. |
| 2011/0184612 A1 * | 7/2011 | Fujii et al. ............ 701/54 |
| 2012/0130608 A1 | 5/2012 | Fujii et al. |
| 2012/0130610 A1 | 5/2012 | Lee et al. |

* cited by examiner

MULTIPLE-RATIO AUTOMATIC TRANSMISSION CONTROL METHOD AND SYSTEM FOR RATIO UPSHIFTS

CROSS-REFERENCE TO RELATED APPLICATIONS

This application is a continuation of application Ser. No. 12/871,485, filed Aug. 30, 2010, and now issued as U.S. Pat. No. 8,337,361 on Dec. 25, 2012, which is a continuation-in-part of application Ser. No. 12/858,468, filed Aug. 18, 2010, and now issued as U.S. Pat. No. 8,328,688 on Dec. 11, 2012, entitled "Ratio Shift Control System and Method for a Multiple-Ratio Automatic Transmission", which is a continuation-in-part of Ser. No. 12/693,086, filed Jan. 25, 2010, which is now abandoned, the disclosures of which are incorporated in their entirety by reference herein and which are assigned to the assignee of the present application. The Applicant claims the benefit of those applications.

TECHNICAL FIELD

The invention relates to control of speed ratio upshifts for a vehicle automatic transmission characterized by reduced transmission output shaft torque transients during an upshift.

BACKGROUND

Known automatic transmissions for automotive vehicles include step ratio controls for effecting speed ratio changes in response to changing driving conditions. The term "speed ratio", for purposes of this description, is defined as transmission input shaft speed divided by transmission output shaft speed.

A so-called speed ratio upshift occurs when the driving conditions require a ratio change from a so-called low ratio (high speed ratio) to a so-called high ratio (low speed ratio) in the transmission gearing. The gearing may include, for example, either a planetary type gear system or a lay shaft type gear system. An automatic gear ratio shift is achieved by friction torque establishing devices, such as multiple disk clutches and multiple disk brakes. The friction torque establishing devices include friction elements, such as multiple plate clutches and band brakes, which may be actuated hydraulically or mechanically. One friction element is engaged in synchronism with disengagement of a companion friction element. However, for purposes of this description, the friction elements may be referred to as an on-coming coupling, clutch or brake and an off-going coupling, clutch or brake. The upshift event is characterized by a preparatory phase, a torque phase and an inertia phase as the vehicle accelerates from a standing start.

During the preparatory stage, a transmission controller reduces off-going clutch torque capacity to prepare for its release. Simultaneously, it adjusts the position of an on-coming clutch actuator to prepare for its engagement. During the torque phase, the controller increases on-coming clutch torque capacity. This causes torque that is transmitted through the off-going clutch to drop significantly in accordance with an increase in torque capacity of the on-coming friction element. The controller may maintain enough off-going clutch torque capacity to keep the off-going clutch securely engaged or locked during the torque phase, which immediately follows the preparatory phase. Alternatively, the controller may allow the off-going clutch to slip at a controlled rate.

During the torque phase of a conventional control system, torque transmitted through the off-going clutch decreases when the transmission output shaft torque drops. This creates a so-called torque hole. A large torque hole can be perceived by the vehicle occupants as an unpleasant shift shock. The inertia phase begins when the off-going clutch is released with no significant torque capacity.

SUMMARY

The embodiment of the invention presently disclosed systematically eliminates or reduces the torque hole during upshifting for a vehicle powertrain with an automatic transmission wherein the off-going clutch is maintained in a locked mode during the torque phase, unlike the control system of co-pending patent application Ser. No. 12/693,083, filed Jan. 25, 2010, which is assigned to the assignee of the present invention. The off-going clutch of the '083 patent application is allowed to slip during the torque phase. This condition occurs before the off-going clutch totally disengages.

During the preparatory phase of the present invention, the off-going clutch capacity (pressure) is decreased in preparation for the release of the off-going clutch. The off-going clutch capacity is decreased to a value that is higher than the input torque in order to ensure that there will be no slippage of the off-going clutch during the torque phase. The on-coming clutch is controlled using governing equations for developing a desired output shaft torque profile during the inertia phase that matches the output shaft torque profile during the torque phase. This can be represented by an output shaft torque profile of linear, unchanging slope in a graphic plot of output shaft torque versus shift time, which demonstrates that a so-called torque hole during the torque phase is either eliminated or significantly reduced during an upshift event. This characteristic increases driving comfort.

The upshift event is characterized by an increased input torque during a torque phase of the upshift event. This is achieved by means of an engine throttle-controlled spark timing adjustment, intake and exhaust valve timing control, a turbo boost, or by any other known torque control technique, including using an auxiliary torque source such as an electric motor. This technique is based on an open loop control, a closed loop control or a combined control method with input speed or off-going clutch torque estimation.

The upshift control of the invention is capable of calibrating a level of on-coming clutch torque capacity that is required for achieving a desired transmission output shaft torque profile for a given off-going clutch capacity when the off-going clutch remains locked during the torque phase of the shift.

The controller of the invention is configured to calibrate a level of input shaft torque that is required for achieving a desired output shaft torque profile for a given on-coming clutch torque capacity when the off-going clutch remains locked during the torque phase. The end of the torque phase is determined based on the torque level transmitted through the locked off-going clutch. The locked off-going clutch is controlled to be released precisely at the beginning of the inertia phase, thereby avoiding a condition referred to as a transmission tie-up when both clutches are engaged simultaneously. This feature achieves a seamless output shaft torque transition from the torque phase to the inertia phase.

BRIEF DESCRIPTION OF THE DRAWINGS

FIG. 1a is a schematic drawing of elements of the control system of the invention, including a generic illustration of a conventional micro-processor for controlling ratio shifts.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
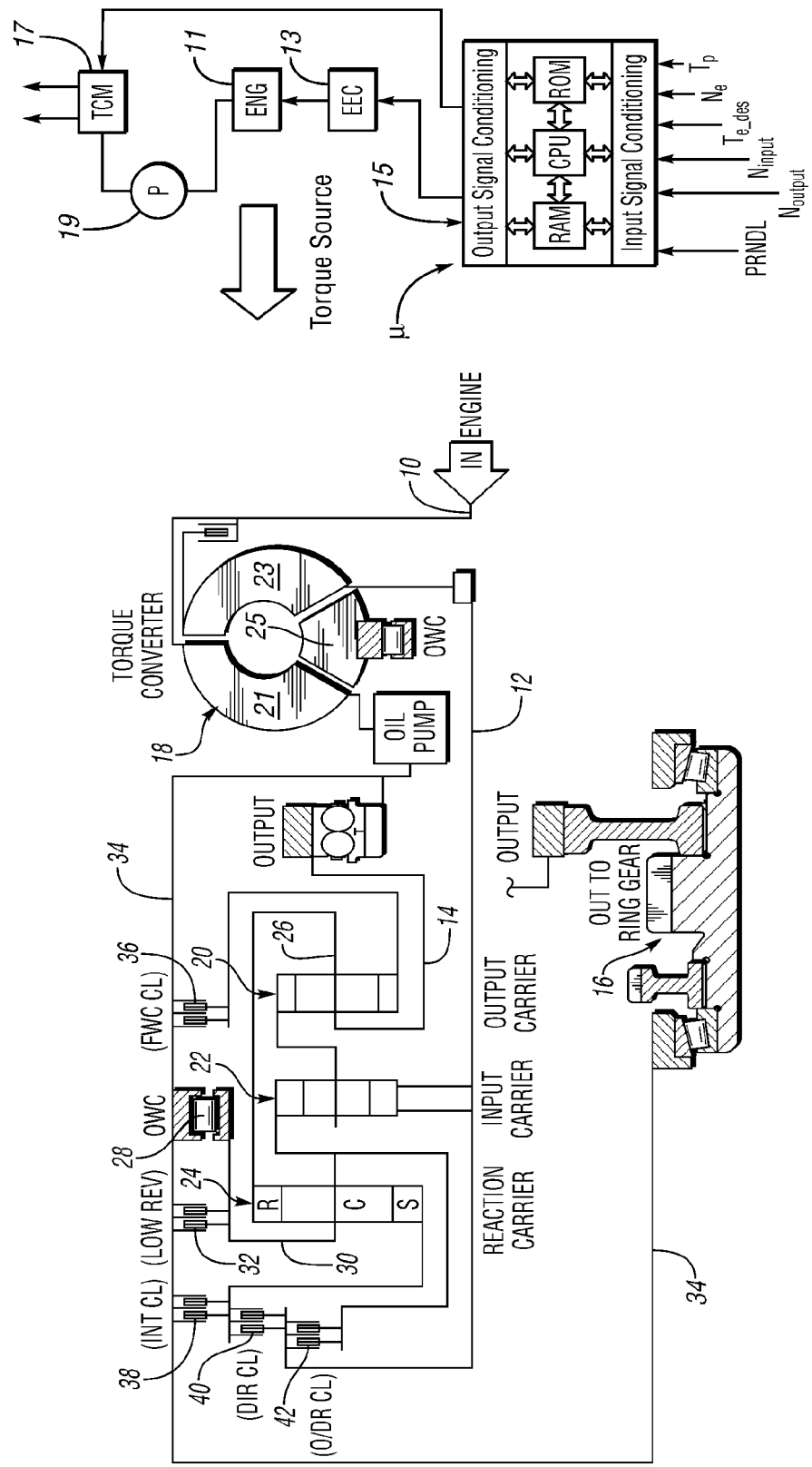
FIG. 1 is an example of a stepped ratio planetary automatic transmission capable of embodying the present invention.

FIG. 1 shows an example of a conventional planetary step-ratio automatic transmission. It comprises an engine driven shaft 10 and a transmission input shaft 12. A transmission output shaft 14 delivers torque to transmission torque output gearing 16. A torque converter may be disposed between engine driven torque input shaft 10 and transmission input shaft 12, as shown at 18. A torque converter impeller 21 is in fluid flow relationship with respect to turbine 23. A stator 25 is disposed between the flow inlet section of impeller 21 and the flow exit section of turbine 23.

In the particular planetary transmission shown in FIG. 1, there are three simple planetary gear units 20, 22 and 24. Output torque is delivered from the carrier 26 to the torque output gearing. Carrier 26 is connected to the ring gear for gear unit 24 and to output shaft 14. An overrunning coupling 28 anchors the carrier 30 of planetary gear unit 24 against rotation in one direction, but free wheeling motion is provided in the opposite direction. During reverse drive and during low ratio operation, carrier 30 is braked by coupling 32 against the transmission housing 34. During forward drive operation, the sun gear for gear unit 20 is anchored to the housing through forward driving coupling 36.

During intermediate ratio operation, the sun gear for gear unit 24 is anchored to the housing 34 by intermediate coupling 38.

During direct drive, input shaft 12 is clutched by direct coupling 40 to input shaft 12, thus establishing a one-to-one driving ratio through the planetary gearing. Overdrive coupling 42, when engaged, directly connects the carrier for gear unit 24 and the ring gear for gear unit 22 to the input shaft 12. FIG. 1a shows an engine 11 which acts as a source of torque for the transmission. If the transmission has a torque converter, engine speed will equal speed of converter impeller 21 and transmission input speed would equal converter turbine speed.

Engine 11 is controlled by an electronic engine control 13, which receives control signals from controller 15 based on multiple variables or driving condition data, such as engine throttle position, engine speed, desired engine torque, input and output speeds and a driver selected ratio range. A transmission control module 17 is also controlled by controller 15. A pump 19, driven by the engine, supplies clutch and brake servo pressure to the transmission under the control of controller 15

Figure 2:
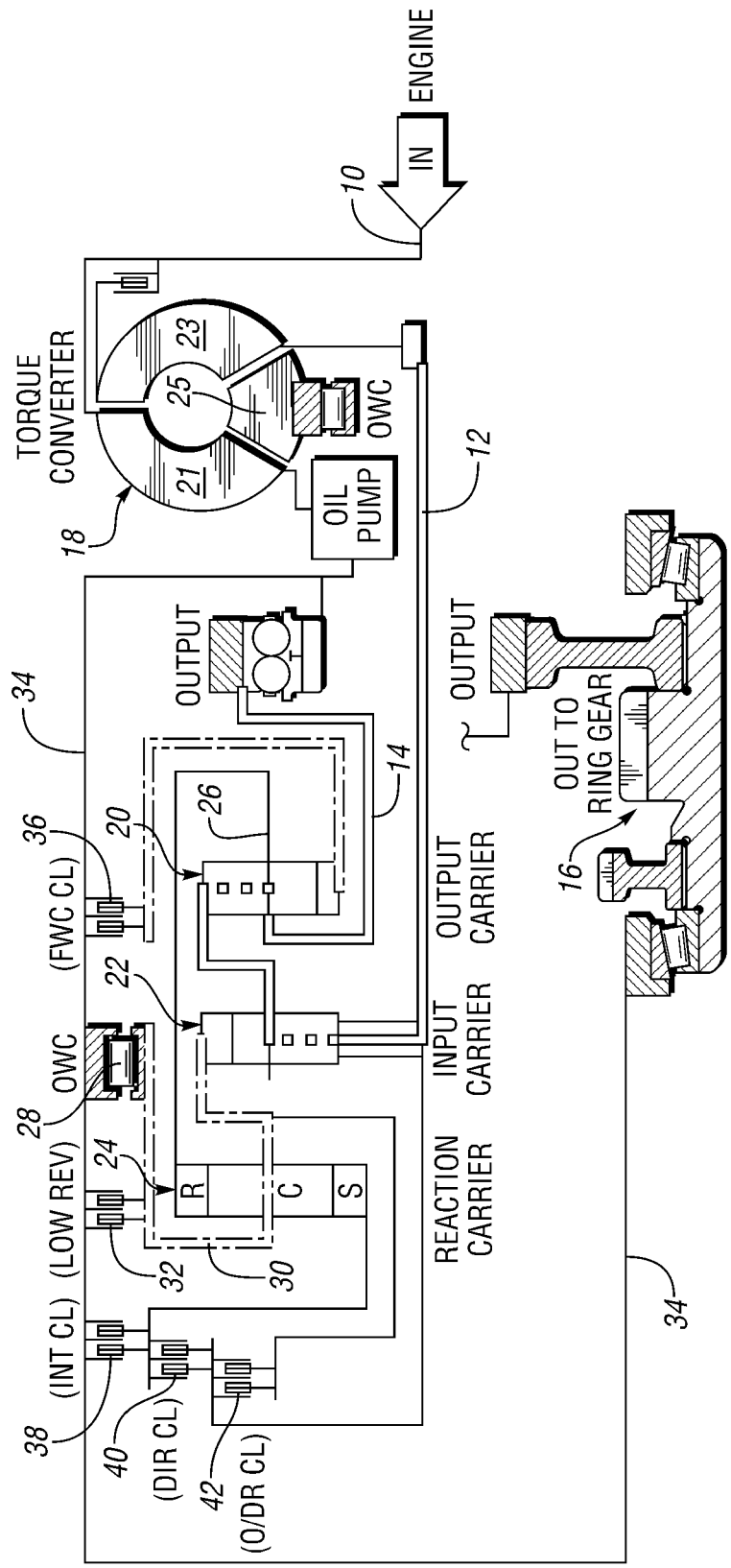
FIG. 2 is an example of a stepped ratio planetary automatic transmission, as shown in FIG. 1, wherein the gearing is conditioned for first gear operation.

FIG. 2 shows the transmission in the first gear configuration. Input torque is delivered to the sun gear of gear unit 22 and the ring gear of gear unit 22 acts as a reaction element as reaction torque is delivered to the housing 34 through overrunning coupling 28. Forward coupling 36 is engaged so that the sun gear of gear unit 20 acts as a reaction element. The carrier 26 is the output element, which delivers torque to the output gearing 16 through a cross drive chain, not shown, or torque transfer gearing.

Figure 3:
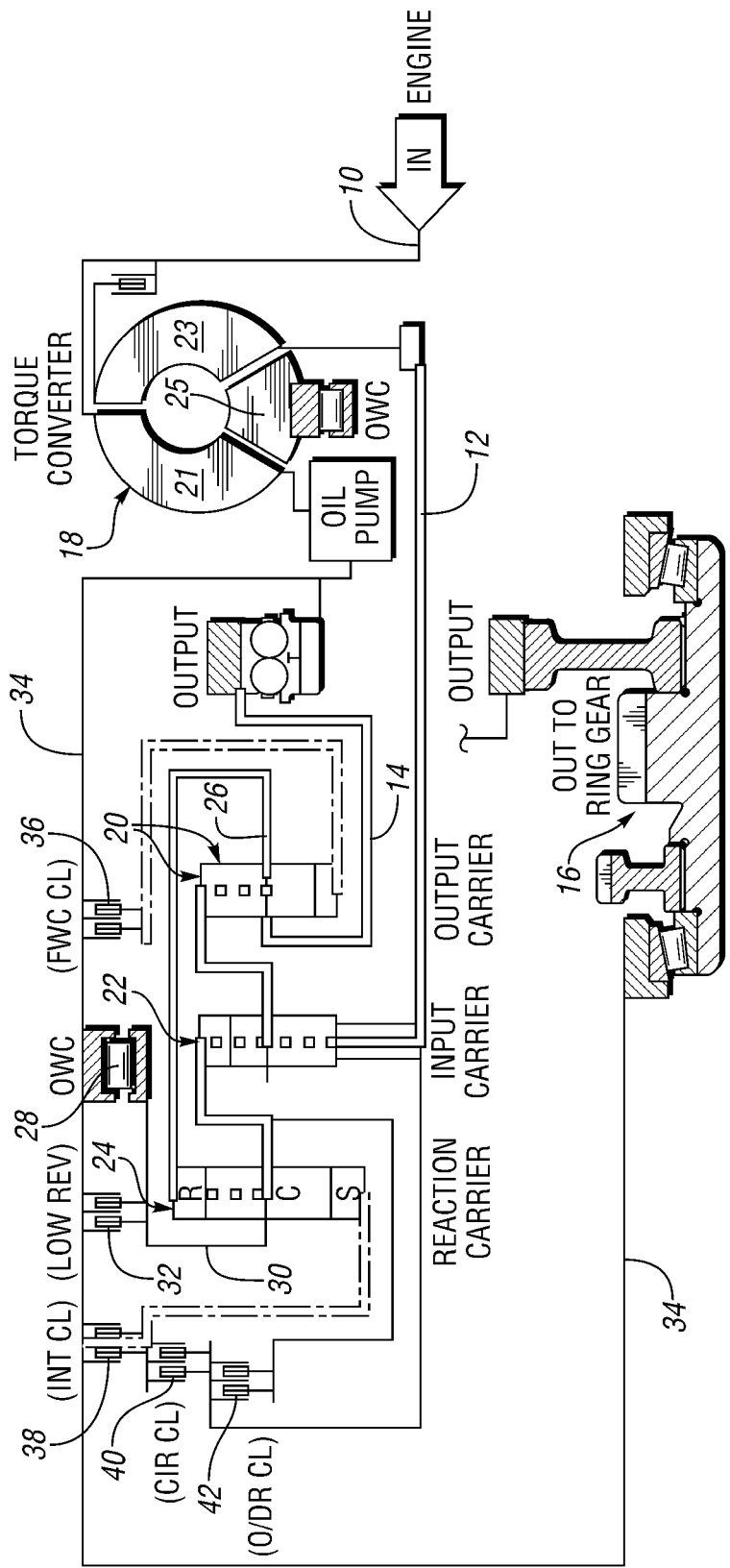
FIG. 3 is an example of a step-ratio, planetary automatic transmission with the gearing conditioned for second gear operation.

Second gear configuration is shown in FIG. 3 where the sun gear for gear unit 24 is anchored by the intermediate coupling 38, and the sun gear for gear unit 20 is anchored by the forward coupling brake 36. Input torque from shaft 12 is delivered to the sun gear of gear unit 22. Driving torque then is divided and delivered to the carrier 30 and to the ring gear for gear unit 20, thus driving carrier 26. A torque flow path through gear unit 22 is established as the carrier for gear unit 22 drives a ring gear for gear unit 20. The carrier 26 of the gear unit 20 acts as a torque output member.

Figure 4:
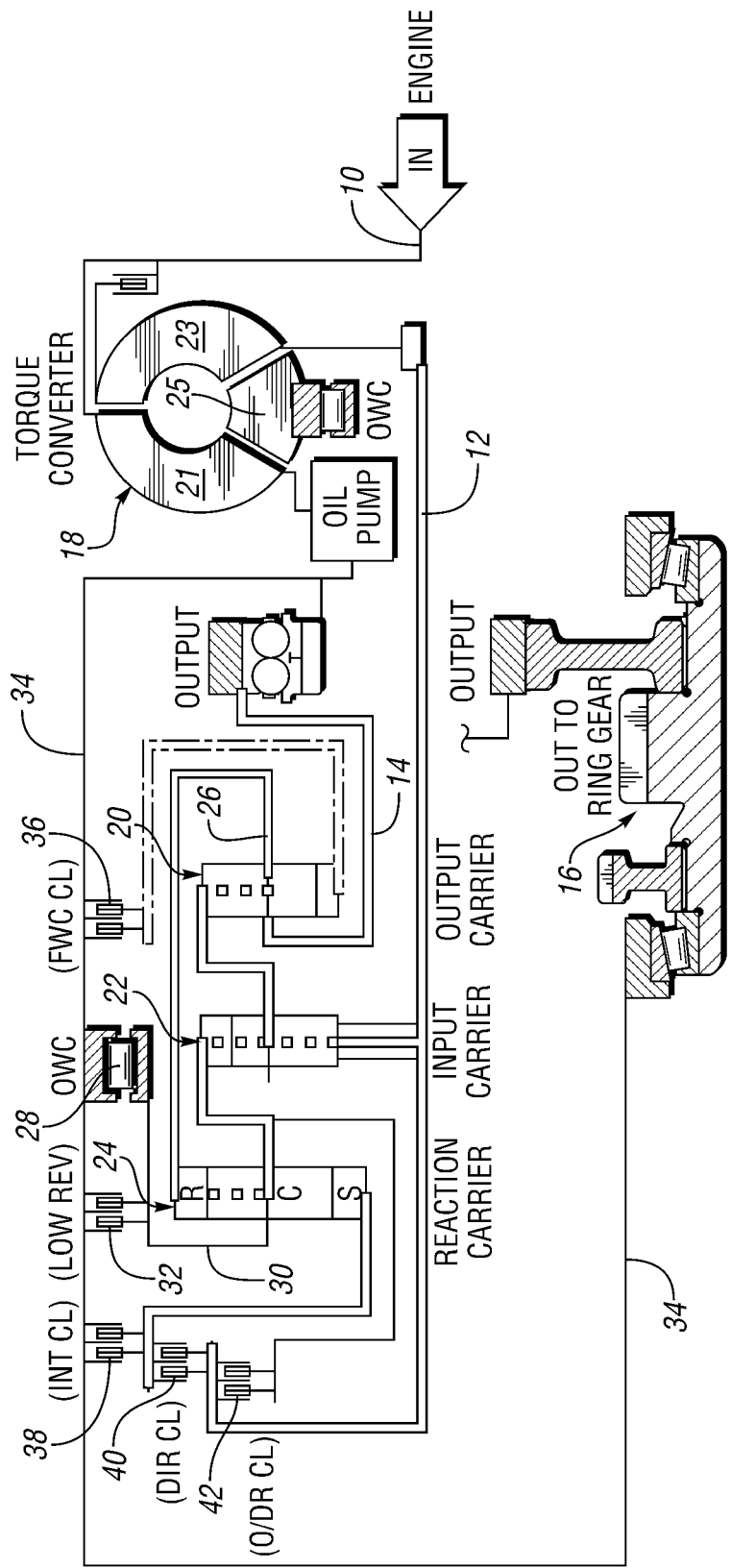
FIG. 4 is an example of a step-ratio planetary automatic transmission in which the gearing is configured for third gear ratio operation.

Third gear configuration is shown in FIG. 4 where input torque from the shaft 12 is delivered through clutch 40 to the sun gear of gear unit 24. The carrier for gear unit 24 drives ring the ring gear for gear unit 22. The ring gear for gear unit 24 drives the carrier for gear unit 20, which is drivably connected to the torque output gearing 16. Torque input shaft 12 also delivers torque to the sun gear of gear unit 22. The divided torque flow path through gear unit 22 extends to the ring gear for gear unit 20.

An automatic transmission embodying the invention may be a planetary type as shown in FIGS. 1-3, or a lay shaft type transmission. A speed ratio change occurs in accordance with driving conditions. This is achieved by the friction elements as described above. The friction elements can be plate clutches or band brakes and may be actuated hydraulically, mechanically or through other means.

During a typical automatic transmission upshift event, a friction element or coupling, referred to as an off-going clutch (OGC), disengages while a different friction element or coupling, referred to as an on-coming clutch (OCC) engages in order to lower a speed ratio.

A shift event can be divided into a preparatory phase, a torque phase and an inertia phase. During the preparatory phase, an automatic transmission controller reduces on-coming clutch torque capacity to prepare for its release while adjusting the position of an on-coming clutch actuator to prepare for its engagement, as described above.

In the first gear configuration, shown in FIG. 2, the overrunning coupling 28 grounds the carrier for reaction gearing 24 and forward clutch 36 grounds the sun gear for planetary gear set 20. All the other clutches are disengaged. The speed ratio for the input shaft to the output shaft is at its highest value for the transmission. During an upshift event, one or more of the clutches are in the process of being engaged or disengaged as the speed ratio of the input shaft 12 to the output shaft 14 varies between two steady-state ratio values.

In the example shown in FIG. 3, there is a change in the torque flow path through the planetary gear sets. Each component of the gear sets has a different level of torque, causing the various components to accelerate or decelerate. The overrunning coupling 28 will begin to overrun, and when the intermediate clutch 38, after it is fully engaged, will cause a speed ratio of the input shaft 12 to the output shaft 14 to be lower than it was in first gear. This shift requires management of the torque of only a single clutch.

FIG. 4 shows an example of a conventional planetary step ratio transmission in third gear configuration. In order to change from the second gear ratio (high speed ratio) to the third gear ratio (low speed ratio), the intermediate clutch 38 is disengaged and the direct clutch 40 is engaged. Clutch 38 will be referred to as the off-going clutch and direct clutch will be referred to as the on-coming clutch (OCC). Both clutches must be managed carefully so that the torque being carried by the off-going clutch 38 is transferred to the on-coming clutch 40 in a smooth manner. The swapping of these two clutches causes the sun gear of the reaction planetary gear unit 24 to be connected to the input shaft 12 instead of being grounded against the housing. Ultimately, the intermediate clutch 38 is fully disengaged and the direct clutch is fully engaged. The speed ratio of the input shaft to the output shaft will be lower than it was in second gear. This shift sequence requires careful management of both clutches 38 and 40.

Figure 5:
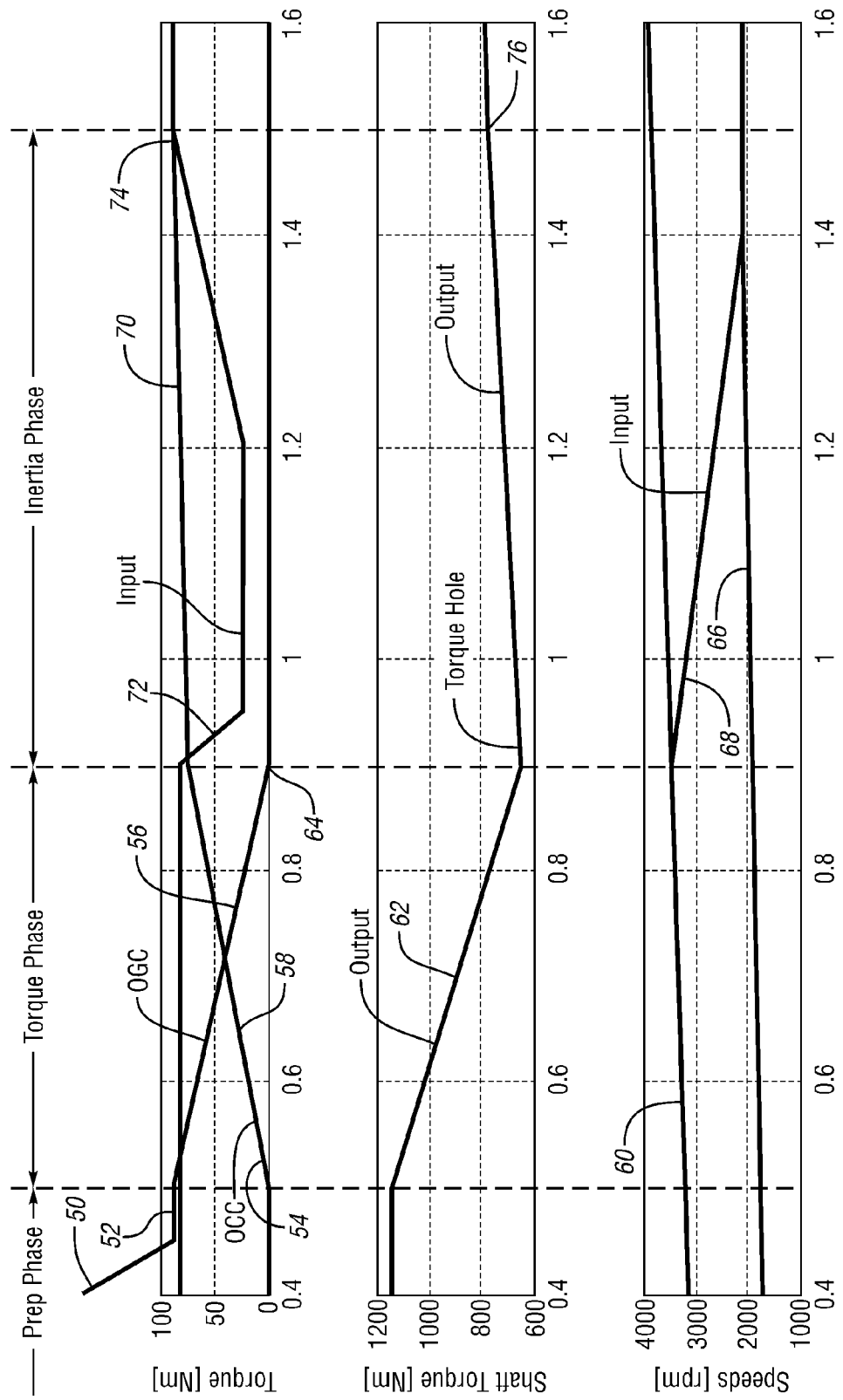
FIG. 5 is a plot showing the shift characteristics of a conventional, synchronous, clutch-to-clutch upshift control for a planetary transmission.

FIG. 5 shows a conventional "power-on" upshift from a low gear configuration to a high gear configuration. The upshift event, diagrammatically illustrated in FIG. 5, is an upshift with an accelerator pedal position greater than zero degrees. The upshift event occurs under a constant engine throttle. This conventional upshift control method is a characteristic of a known planetary type transmission system, as illustrated in FIGS. 1-4, but it could apply also to a lay-shaft type transmission.

The conventional upshift event, illustrated in FIG. 5, is divided into a preparatory phase, a torque phase and an inertia phase. It will be assumed, in a description of the upshift control of FIG. 5, that the upshift is accomplished with two clutches that are controlled synchronously, one clutch releasing from a holding state, which is called the off-going clutch, and one clutch engaging from an open state, called the on-coming clutch. Other transmissions can use other types of friction elements besides clutches, but the principles would be the same.

During the preparatory phase, the torque capacity of the off-going clutch (OGC), is reduced, as shown at 50, to prepare release of the OGC. However, enough OGC torque capacity is maintained to keep the OGC from slipping. A transmission controller adjusts an actuator piston for the clutch pressure operated servo for the on-coming clutch (OCC) to prepare for engagement of the OCC. At the end of the preparatory phase, the on-coming clutch (OCC) is yet to carry significant torque capacity, as shown at 54.

During the torque phase, OGC torque capacity is further reduced, as shown at 56, while the controller increases OCC torque capacity, as shown at 58. The OGC is still securely locked without slipping, which maintains a torque flow path in the low gear configuration. Accordingly, the input shaft speed 60 remains the same as that of the output shaft speed multiplied by the gear ratio of the low gear.

The engine speed and the input shaft speed are not necessarily interchangeable because the engine may be connected to the input shaft through a torque converter, thus the term "input shaft speed" may be used in this description rather than engine speed.

If the OGC torque capacity were to be controlled to induce a small slip, the input shaft speed would be higher than that of the output shaft speed multiplied by the gear ratio of the low gear configuration. When OGC slips, it is OGC slip torque capacity for the OGC plot at 56 that drives the downstream gear elements all the way to the output shaft.

During the torque phase, increasing on-coming clutch torque capacity reduces the net torque flow through the off-going clutch when the off-going clutch remains engaged or locked. Thus, the outshaft torque drops significantly, as shown at 62, creating a so-called torque hole representing a significant, immediate reduction in output shaft torque. A large torque hole can be perceived by a vehicle occupant as sluggish powertrain performance or an unpleasant shift shock.

The inertia phase begins when the off-going clutch torque capacity is reduced to a non-significant level 64. The on-coming clutch carries enough torque capacity, shown at 70, to hold down input speed, seen at 68, closer to the speed of the output shaft, seen at 66, multiplied by the ratio of the high gear configuration. The input speed is higher during the torque phase as seen at 60. During the inertia phase, the output shaft torque is primarily affected by the on-coming clutch torque capacity at 70.

Shown in FIG. 5 is a reduced input torque at 72 during the inertia phase. This reduction is achieved by controlling engine spark timing, which is a common practice in conventional shift control strategies. It enables the on coming clutch to engage within a calibration target shift duration without requiring excessive torque capacity.

The shift event is completed when the on-coming clutch is fully engaged. The input shaft then is securely coupled to the output shaft through the high gear ratio configuration. Further, the input speed is matched to the output shaft speed multiplied by the gear ratio of the high gear configuration. The input torque truncation at 72 is removed, and the input torque then returns to the level at point 74, which corresponds to the input torque at the beginning of the inertia phase. The output shaft torque returns to the level shown at 76, which corresponds to the input shaft torque level at 74 in the high gear configuration.

Figure 6:
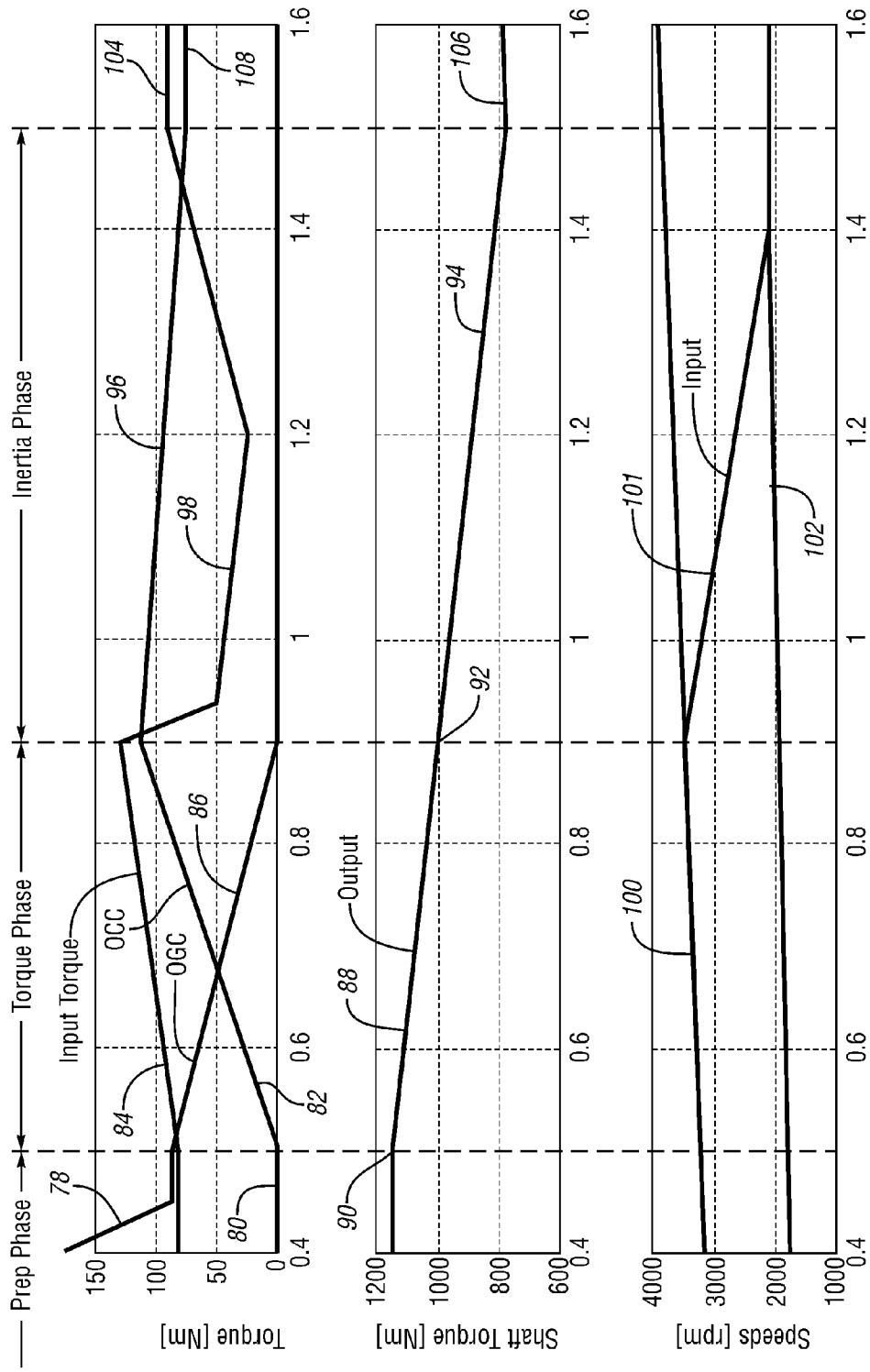
FIG. 6 is a plot of the shift characteristics for a synchronous upshift control for a planetary transmission according to the present invention.

In contrast to the known upshift control strategy of FIG. 5, FIG. 6 shows an embodiment of an upshift control method according to the present invention for a planetary transmission of the kind depicted in FIGS. 1-4. As in the case of FIG. 5, FIG. 6 is divided into a preparatory phase, a torque phase and an inertia phase. During the preparatory phase, a transmission controller reduces the torque of an off-going clutch, as shown at 78, to prepare for release of the off-going clutch. It is usually desired to keep the off-going clutch torque above the reaction torque until the reaction torque reaches near zero. The controller also adjusts the actuator position for the on-coming clutch to prepare for engagement of the OCC.

During the torque phase, the controller raises on coming clutch torque for engagement of the OCC, as shown at 82. Input torque is increased, as shown at 84, while the off-going clutch torque is further reduced, as shown at 86, while not allowing slip of the OGC. When the off-going clutch is locked, torque transmitted from the input shaft to the output shaft is reduced by on-coming clutch torque capacity at 82. Thus, by keeping the off-going clutch locked, the transmission controller can actively manage torque level that drives the output shaft by adjusting only the on-coming clutch torque at 86.

The output shaft torque $\tau_{os}$ can be algebraically described as follows:

$$\tau_{os} = G_{on}\tau_{on} + G_{off}\tau_{off} \qquad (1)$$

where $\tau_{on}$ is OCC torque capacity as reflected at the transmission gearing input, $\tau_{off}$ is OGC torque transmitted (which would be equal to the capacity if clutch is slipping) as reflected at the transmission gearing input, $G_{off}$ is gear ratio of the low gear, and $G_{on}$ is gear ratio of the high gear. Equation (1) can be rearranged as:

$$\tau_{on} = \frac{\tau_{os} - G_{off}\tau_{off}}{G_{on}} \qquad (2)$$

Rewriting $\tau_{on}$ as $\tau_{os,des}$, Equation (2) can be expressed as:

$$\tau_{on} = \frac{\tau_{os,des} - G_{off}\tau_{off}}{G_{on}}, \quad (3)$$

where $\tau_{os,des}$ is a desired output shaft torque.

The governing Equation (3) provides a systematic self-calibration of a level of OCC torque capacity $\tau_{on}$ for achieving a desired output torque profile $\tau_{os,des}$ while OGC remains locked during the torque phase. More specifically, a torque profile can be specified to smoothly connect the plot and output shaft torque 88 before the start of the torque phase and after the end of the torque phase, thereby eliminating or reducing the torque hole. OGC torque $\tau_{off}$ can be estimated and the torque capacity can be actively adjusted so that the capacity is higher than the clutch torque until the clutch torque reaches zero or some low threshold. Thus, for a given $\tau_{off}$, Equation (2) specifies a level of OCC torque capacity $\tau_{on}$ required for achieving a desired output shaft torque at 88. The OGC transmits a part of the input torque 82 through the gear units to the output.

Output shaft torque is described as:

$$\tau_{os} = G_{off}\tau_{in} + (G_{on} - G_{off})\tau_{on}, \quad (4)$$

where $\tau_{in}$ is the input torque, for example from an engine through a torque converter. Replacing $\tau_{on}$ with a desired torque profile $\tau_{os,des}$, Equation (4) can be rearranged as:

$$\tau_{on} = \frac{\tau_{os,des} - G_{off}\tau_{in}}{G_{on} - G_{off}}, \quad (5)$$

or $$\tau_{in} = \frac{\tau_{os,des} - (G_{on} - G_{off})\tau_{on}}{G_{off}}$$

Torque variables $\tau_{on}$ and $\tau_{in}$ can be represented as:

$$\tau_{os,des} = \tau_{os_0} - \Delta\tau_{os} \text{ and } \tau_{in} = \tau_{in_0} + \Delta\tau_{in}, \quad (6)$$

where $\tau_{os_0}$ and $\tau_{in_0}$ are the output shaft torque and input torque at the beginning of the torque phase, respectively. $\Delta\tau_{os}$ and $\Delta\tau_{in}$ represent the change in output shaft torque and input torque, respectively, at the elapsed time $\Delta t$ after the torque phase begins. Substituting Equation (6) into Equation (5) yields:

$$\tau_{on} = \frac{\Delta\tau_{os,des} + G_{off}\Delta\tau_{in}}{G_{off} - G_{on}}. \quad (7)$$

OCC torque $\tau_{on}$ can be written as:

$$\tau_{on} = \tau_{on_0} + \Delta\tau_{on}, \quad (8)$$

where $\tau_{on_0}$ is the OCC torque capacity at the beginning of the torque phase and $\Delta\tau_{on}$ is the change in OCC torque at $\Delta t$. Substituting Equation (8) into Equation (7) results in:

$$\Delta\tau_{on} = \frac{\Delta\tau_{os,des} - G_{off}\Delta\tau_{off}}{G_{on}} \quad (9)$$

where $\Delta\tau_{off} = \tau_{in} - \Delta\tau_{on}$. Note that Equation (9) takes the same form as the Equation (3).

The governing Equations (5), (7) and (9) provide a systematic means to self-calibrate a level of OCC torque capacity $\tau_{on}$ for achieving a desired output torque profile $\tau_{os,des}$ during the torque phase when OGC remains locked. More specifically, a torque profile $\tau_{os,des}$ can be specified to smoothly connect output shaft torque 88 before point 90 and after point 92 of the torque phase, thereby eliminating or reducing the torque hole.

For a given $\tau_{in}$ at 84, Equation (5) specifies a level of OCC torque capacity $\tau_{on}$ at 82 required for achieving the target profile $\tau_{os,des}$ at 88. Alternatively, for given $\tau_{on}$ at 82, Equation (5) may be used to systematically determine a target $\tau_{in}$ at 84 required for achieving $\tau_{os,des}$ at 88. Once the target level is determined, $\tau_{in}$ can be controlled by an engine, for example, through a combination of engine throttle control, spark timing control, intake and exhaust valve timing control, turbo boost control or through an auxiliary torque source such as an electric motor. Note that input torque control is coupled to OCC torque control in Equation (5).

The inertia phase begins when OGC is released. OGC transmits torque only at a non-significant level while OGC carries enough torque capacity 96 to slow down input speed, as shown at 101, closer to that of output shaft at 102 multiplied by the ratio of the high gear. Input speed during the torque phase is shown at 100 in FIG. 6. Under this condition, both Equation (3) and Equation (5) can be reduced to:

$$\tau_{on} = \frac{\tau_{os,des}}{G_{on}}. \quad (10)$$

Thus, the output shaft torque $\tau_{os}$ 94 is primarily affected during the inertia phase by OCC torque capacity $\tau_{on}$ at 96 during the inertia phase. At this time, OCC torque capacity may be decreased in a controlled manner until the end of the inertia phase. According to the invention, Equation (10) is utilized to provide a target OCC torque capacity $\tau_{on}$ during the inertia phase. This is required to achieve a seamless output shaft torque profile $\tau_{os,des}$ from the torque phase to the inertia phase.

FIG. 6 shows reduced input torque at 98 during the inertia phase. This is a common practice in a known shift control method. It reduces the inertia torque arising from deceleration of the input shaft during the inertia phase, thus enabling the OCC to engage within target shift duration without requiring excessive torque capacity. The shift event completes when OCC is fully engaged. The input shaft is securely coupled to the output shaft through the high gear ratio, matching input speed 101 to output shaft speed 102 multiplied by the ratio of the high gear upon completion of a shift event. The engine torque truncation is removed at 104, and the output shaft torque returns to the level at 106 that corresponds to an input torque level at 108 in the high gear configuration.

Figure 7:
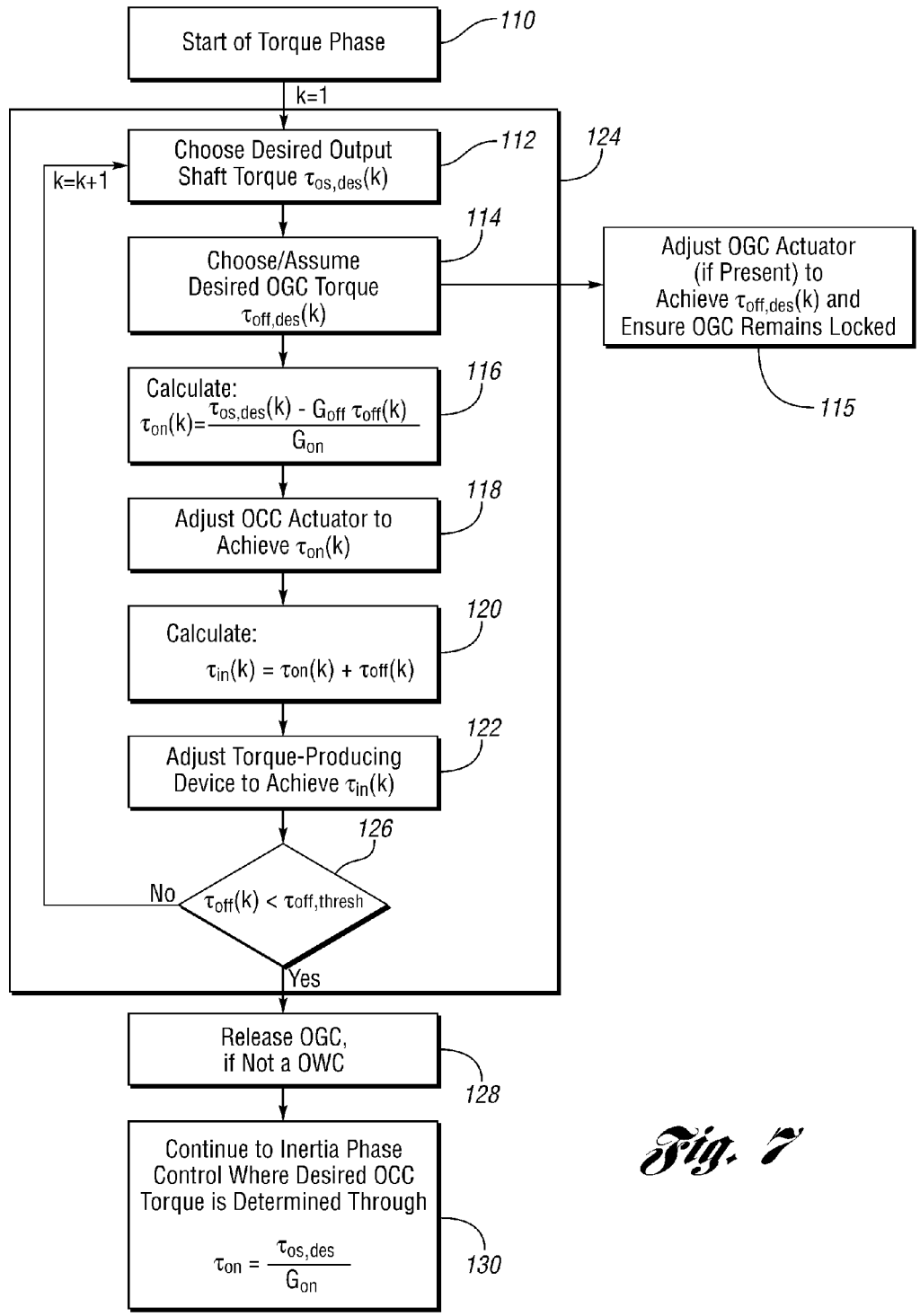
FIG. 7 is a flowchart of an upshift control with a locked off-going clutch according to the present invention.

FIG. 7 shows a control flow chart of an embodiment of the invention when OGC is locked during a torque phase. It describes a systematic approach to enable the shift control depicted in FIG. 6. During the torque phase, a controller first chooses a desired level of output shaft torque. It also chooses (in the case of a clutch) or estimates (in the case of a one-way clutch) the desired OGC torque capacity at 114. The OGC actuator is adjusted at 115 to ensure that the OGC does not slip. If the OGC is a one-way clutch, the torque is determined by OCC torque capacity. If the OGC is a clutch or other friction element, the OGC torque capacity is adjusted through either closed loop control or open loop control of its actuator position or actuator force. Then the controller uses Equation (3) to self-calibrate the required level of OCC torque capacity, as shown at 116. It adjusts the OCC actuator, as shown at 118, to achieve the desired OCC torque capacity.

Based on the commanded OCC torque capacity and the OGC torque (actual torque transmitted by the off-going clutch as reflected at the transmission gearing input), the controller calculates at 120 the input torque needed to maintain the current input speed acceleration. It then adjusts at 122 the torque-producing device (usually an engine) to produce the calculated amount of input torque.

The controller evaluates whether the end of the torque phase is reached based upon OGC torque. If the end is not reached, it repeats the control loop 124. It re-estimates the desired output shaft torque at 112 and chooses (or assumes in case of a non-synchronous shift) OGC torque at 114 for the next control time step k+1, and so on. The end of torque phase is reached when OGC torque becomes sufficiently small or less than a pre-specified threshold $\tau_{off,thres}$ at 126. The controller releases OGC at 128 (if it is not a one-way clutch) and moves to the inertia phase control, as shown at 130, where Equation (10) is utilized to determine a target OCC torque for a seamless output shaft torque transition from the torque phase to the inertia phase.

Figure 8:
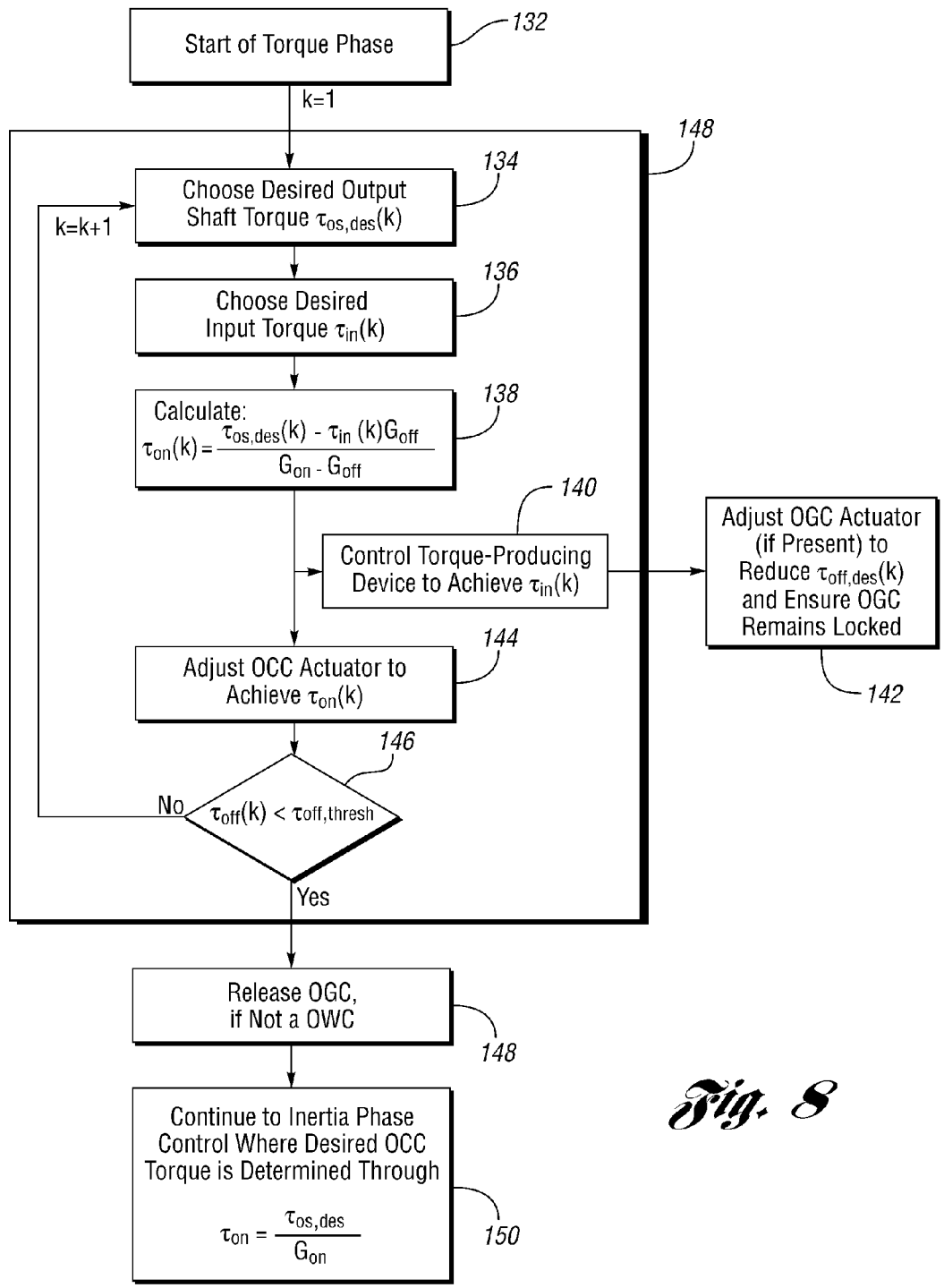
FIG. 8 is a variation of the upshift control illustrated in FIG. 7.

FIG. 8 shows a control flow chart of another embodiment of the synchronous shift control of the invention when OGC is locked during a torque phase. It describes a systematic approach to enable the shift control depicted in FIG. 6. During the torque phase, which starts at 132, a controller first chooses a desired level of output shaft torque at 134 and input torque at 136. Then the controller utilizes Equation (5) to self-calibrate the required level of OCC torque capacity at 138. While slipping, the torque capacity of the OCC would be the actual torque transmitted by the clutch. Alternatively, Equation (7) or (9) may be utilized, in place of Equation (5), to calculate the required increment of OCC torque capacity $\Delta\tau_{on}$ at the elapsed time $\Delta t$ after the beginning of the torque phase based on $\tau_{in}$ and $\Delta\tau_{os,des}$.

The controller brings the input torque to the desired level at 140 using any available control means. If the torque-producing device is an engine, this could include any of the following in any combination: throttle control, spark timing control, intake and exhaust valve timing control, turbo boost control, etc. If the OGC is not a one-way clutch, and if it has an actuator for capacity control, the controller may reduce OGC torque capacity, as shown at 142, without inducing a slip. Alternatively, it may not reduce capacity, keeping the OGC locked as the transmitted torque decreases by way of the OCC "picking up" torque. At the same time, it adjusts the OCC actuator at 144 to realize the desired output shaft torque according to Equation (5).

The controller evaluates at 146 whether the end of torque phase is reached based upon OGC torque level (actual torque transmitted by the off-going clutch as reflected at the transmission gearing input) using this equation: $\tau_{off}=\tau_{in}-\tau_{os}$. If not, it repeats the control loop 148. It re-calculates desired output shaft torque at 134 and input torque at 136, etc. for the next control time step k=k+1. The end of torque phase is reached when OGC torque becomes less than a pre-specified threshold $\tau_{off,thres}$ at 146. The controller releases OGC at 148 (if it is not a one-way clutch) and moves to the inertia phase control. Equation (10) is utilized at 150 to determine a target OCC torque for seamless output shaft torque transition from the torque phase to the inertia phase according to this invention.

Figure 9:
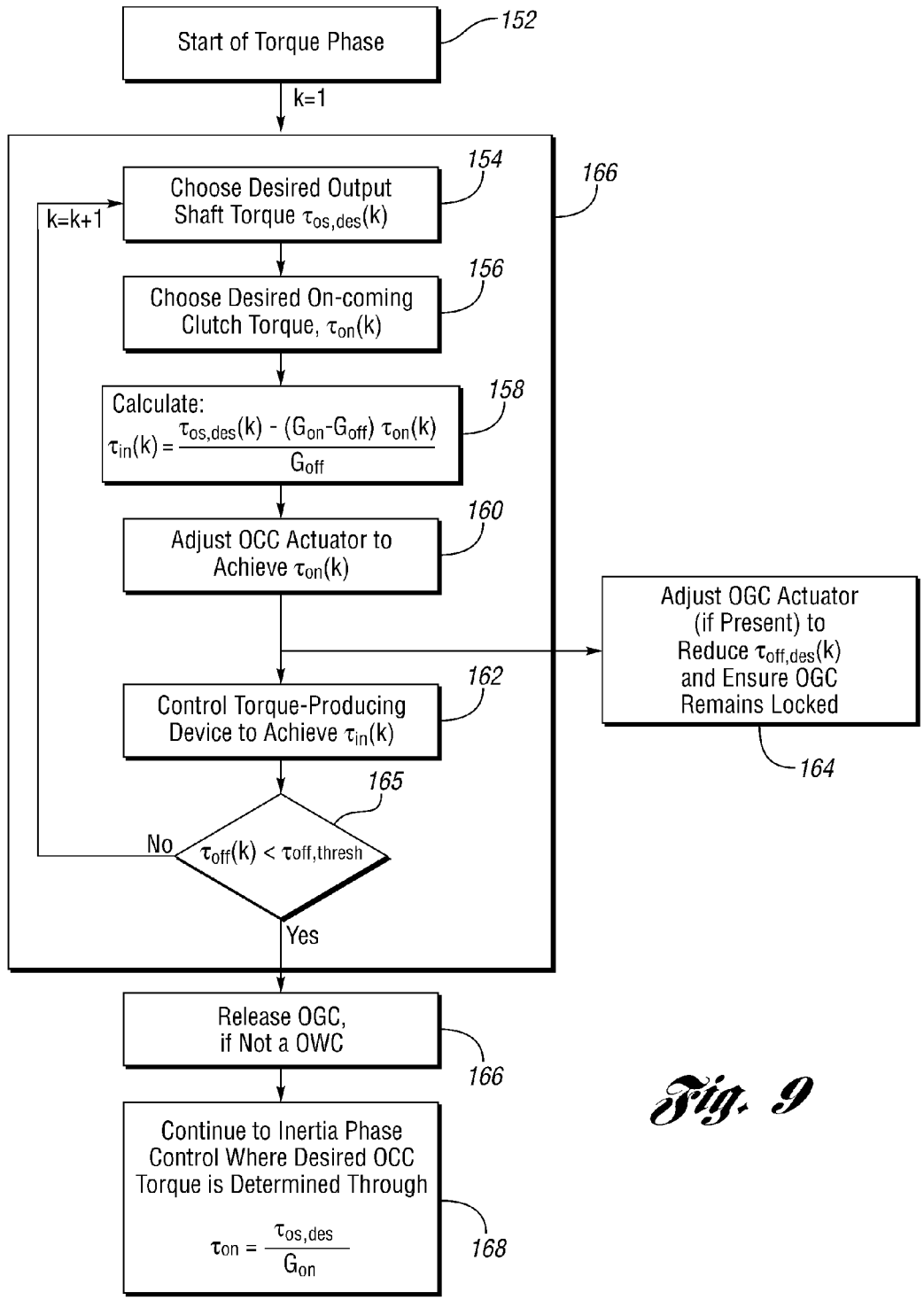
FIG. 9 is another variation of an upshift control for a locked off-going clutch.

FIG. 9 shows a control flow chart for a third possible embodiment of the synchronous shift control of the invention when OGC is locked during a torque phase. It describes a systematic approach to enable the shift control depicted in FIG. 6. During a torque phase, which starts at 152, a controller first chooses a desired level of output shaft torque at 154 and OCC torque capacity 156. Then the controller utilizes Equation (5) at 158 to self-calibrate the required level of input torque. Alternatively, Equation (7) or (9) may be utilized, in place of Equation (5), to calculate the required increment of input torque $\Delta\tau_{in}$ at the elapsed time $\Delta t$ after the beginning of the torque phase based on $\Delta\tau_{on}$ and $\Delta\tau_{os,des}$. The controller adjusts OCC actuator at 160 to realize the desired OCC torque capacity.

The controller brings the input torque to the desired level at 162 using any available control means. If the torque-producing device is an engine, this could include any of the control techniques previously described. If the OGC is not a one-way clutch and has an actuator for capacity control, as previously explained with respect to FIG. 8, the controller may reduce OGC torque capacity at 164 without inducing a slip. Alternatively, as previously explained with respect to FIG. 8, it may not reduce capacity, keeping the OGC locked as the transmitted torque decreases.

The controller evaluates at 165 whether the end of the torque phase is reached based upon OGC torque level using this relationship: $\tau_{off(k)}<\tau_{off,thres}$. If $\tau_{off(k)}$ is not less than $\tau_{off,thres}$, the control loop 166 is repeated. The controller then chooses at 166 the desired output shaft torque at 154 and the desired OCC torque at 156, etc. for the next control time step k=k+1. The end of torque phase is reached at 165 when OGC torque becomes less than a pre-specified threshold $\tau_{off,thres}$. The controller releases OGC at 166 and moves to the inertia phase control. Equation (10) is used to determine a target OCC torque at 168 for seamless output shaft torque transition from the torque phase to the inertia phase.

In executing the control strategy of the invention, engine torque and input torque to the transmission are controlled accurately so that synchronization is established for clutch engagement and clutch release. At the end of the torque phase, this control will emulate the behavior of a transmission having an overrunning coupling rather than an off-going clutch, which effects a non-synchronous upshift. If the torque transition occurs too soon, the engine will tend to experience an engine speed "flare." If the off-going clutch is release too late, the powertrain will experience a "tie up" of the clutches, which will cause a torque disturbance due to simultaneous engagement of the clutches.

The initial reduction in the capacity of an off-going clutch during the preparatory phase is made so that excessive off-going clutch capacity is avoided. It is only necessary to maintain an off-going clutch capacity to avoid slipping.

While embodiments of the invention have been illustrated and described, it is not intended that these embodiments illustrate and describe all possible forms of the invention. Rather, the words used in the specification are words of description rather than limitation. It is understood that various changes may be made without departing from the spirit and scope of the invention.

What is claimed is:

1. A multiple-ratio transmission wherein a powertrain source provides an input torque to the transmission, the transmission comprising:
   oncoming and off-going clutches for effecting ratio shifts;
   a controller, during a ratio upshift event, configured to:
   increase torque capacity of the oncoming clutch while torque capacity of the off-going is reduced and maintained locked;
   increase the input torque during a torque phase before start of an inertia phase; and
   decrease transmission input torque at a controlled rate during the inertia phase;
   thereby minimizing torque transients along the output shaft during the upshift.

2. The multiple-ratio transmission set forth in claim 1, wherein the off-going coupling is an overrunning coupling adapted to brake a reaction gear element of the transmission whereby the upshift is a non-synchronous upshift.

3. The multiple-ratio transmission as set forth in claim 1, wherein the torque phase of an upshift is preceded by a preparatory phase, and the controller is configured to:
   decrease torque capacity of the off-going clutch during the preparatory phase to a value that is sufficient to keep the off-going clutch locked at the start of the torque phase, such that the torque capacity of the off-going clutch during the torque phase maintains the off-going clutch locked without slipping until the end of the torque phase.

4. The multiple-ratio transmission as set forth in claim 1, wherein the controller is further configured to:
choose a desired output shaft torque at the start of a torque phase of the upshift;
determine a desired off-going clutch torque based on a desired output shaft torque;
calculate an on-coming clutch torque capacity as a function of desired output shaft torque, gear ratio for a high gear ratio configuration, and gear ratio for a lower gear ratio configuration;
calculate a transmission input shaft torque as a function of torque capacity of one of the oncoming or off-going clutches; and
release the one of the oncoming or off-going clutches at the end of the torque phase if the torque capacity of the other oncoming or off-going clutches is less than a pre-calibrated threshold as an inertia phase begins.

5. The multiple-ratio transmission as set forth in claim 1, wherein the torque capacity of the one oncoming or off-going clutches is determined in the inertia phase as a function of desired output shaft torque and an upshift gear ratio.

6. The multiple-ratio transmission set forth in claim 4, wherein calculating the transmission input shaft torque is repeated in a closed loop control if the torque capacity of the other of the oncoming or off-going clutches is greater than a pre-calibrated threshold.

7. A method for controlling an upshift of a multiple-ratio vehicle transmission comprising:
increasing torque capacity of an oncoming clutch while torque capacity of an off-going clutch is reduced and maintains locked;
increasing a transmission input torque during a torque phase before start of an inertia phase; and
decreasing the input torque during the inertia phase, thereby minimizing torque transients during the upshift.

8. The method set forth in claim 7, further comprising decreasing torque capacity of the oncoming clutch at the start of the inertia phase.

9. The method set forth in claim 7, wherein the off-going clutch comprises an overrunning coupling adapted to brake a reaction gear element of the transmission, whereby the upshift is a non-synchronous upshift.

10. The method set forth in claim 7, wherein the torque phase of an upshift is preceded by a preparatory phase, and the method further comprising:
decreasing torque capacity of the off-going clutch during the preparatory phase to a value that is sufficient to keep the off-going clutch locked at the start of the torque phase, such that the torque capacity of the off-going clutch during the torque phase maintains the off-going clutch locked without slipping until the end of the torque phase.

11. The method set forth in claim 7, further comprising:
choosing a desired output shaft torque at the start of a torque phase of the upshift;
determining a desired off-going clutch torque based on a desired output shaft torque;
calculating an on-coming clutch torque capacity as a function of desired output shaft torque, gear ratio for a high gear ratio configuration, and gear ratio for a lower gear ratio configuration;
calculating a transmission input shaft torque as a function of torque capacity of one of the oncoming or off-going clutches; and
releasing the one of the oncoming or off-going clutches at the end of the torque phase if the torque capacity of the other oncoming or off-going clutches is less than a pre-calibrated threshold as an inertia phase begins.

12. The method set forth in claim 11, wherein the torque capacity of the one oncoming or off-going clutches is determined in the inertia phase as a function of desired output shaft torque and an upshift gear ratio.

13. The method set forth in claim 11, wherein calculating the transmission input shaft torque is repeated in a closed loop control if the torque capacity of the other of the oncoming or off-going clutches is greater than a pre-calibrated threshold.

14. A control system for a multiple-ratio transmission comprising:
a controller for activating oncoming and off-going clutches during ratio shifts, wherein, during a ratio upshift, the controller is configured to:
increase an oncoming clutch torque capacity while an off-going clutch torque capacity is reduced and maintained locked;
increase a transmission input torque during a torque phase before start of an inertia phase;
decreasing the input torque during the inertia phase; and
decreasing the oncoming clutch torque capacity during the inertia phase.

15. The control system set forth in claim 14, wherein the off-going clutch comprises an overrunning coupling adapted to brake a reaction gear element of the transmission, whereby the upshift is a non-synchronous upshift.

16. The control system set forth in claim 14, wherein the torque phase of an upshift is preceded by a preparatory phase, and the controller is further configured to:
decrease torque capacity of the off-going clutch during the preparatory phase to a value that is sufficient to keep the off-going clutch locked at the start of the torque phase, such that the torque capacity of the off-going clutch during the torque phase maintains the off-going clutch locked without slipping until the end of the torque phase.

17. The control system set forth in claim 14, wherein the controller is further configured to:
choose a desired output shaft torque at the start of a torque phase of the upshift;
determine a desired off-going clutch torque based on a desired output shaft torque;
calculate an on-coming clutch torque capacity as a function of desired output shaft torque, gear ratio for a high gear ratio configuration, and gear ratio for a lower gear ratio configuration;
calculate a transmission input shaft torque as a function of torque capacity of one of the oncoming or off-going clutches; and
release the one of the oncoming or off-going clutches at the end of the torque phase if the torque capacity of the other oncoming or off-going clutches is less than a pre-calibrated threshold as an inertia phase begins.

18. The control system set forth in claim 17, wherein the torque capacity of the one oncoming or off-going clutches is determined in the inertia phase as a function of desired output shaft torque and an upshift gear ratio.

19. The control system set forth in claim 17, wherein calculating the transmission input shaft torque is repeated in a closed loop control if the torque capacity of the other of the oncoming or off-going clutches is greater than a pre-calibrated threshold.

* * * * *